Patented Sept. 29, 1925.

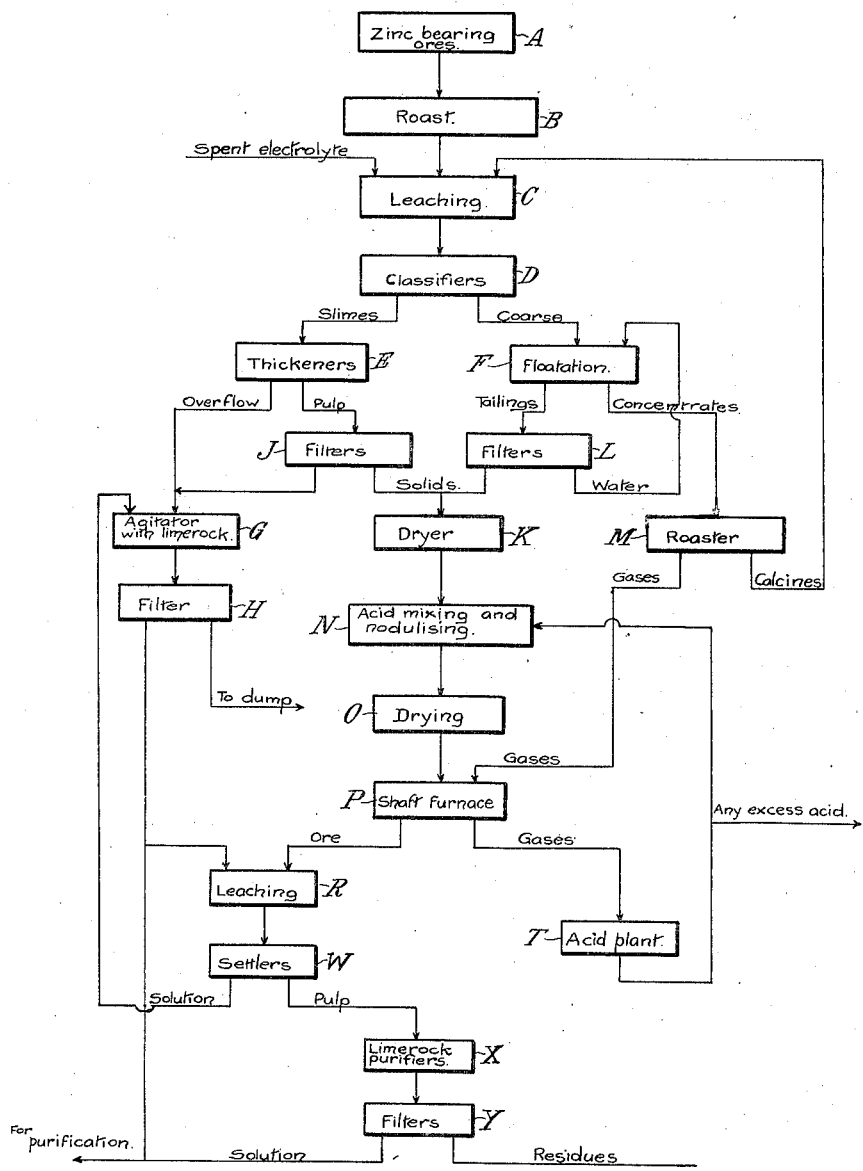

1,555,567

UNITED STATES PATENT OFFICE.

HERBERT WILLIAM GEPP, HARRY HEY, AND GILBERT RIGG, OF MELBOURNE, VICTORIA, AND ROYALE HILLMAN STEVENS AND ROWLAND THOMAS DRYLL WILLIAMS, OF HOBART, TASMANIA, AUSTRALIA, ASSIGNORS TO ELECTROLYTIC ZINC COMPANY OF AUSTRALASIA LIMITED, OF MELBOURNE, VICTORIA, AUSTRALIA.

ELECTROLYTIC RECOVERY OF ZINC FROM ZINC-BEARING ORES AND METALLURGICAL PRODUCTS.

Application filed July 30, 1923. Serial No. 654,776.

*To all whom it may concern:*

Be it known that HERBERT WILLIAM GEPP, HARRY HEY, and GILBERT RIGG, all of Collins House, 360 Collins Street, Melbourne, in the State of Victoria, ROYALE HILLMAN STEVENS and ROWLAND THOMAS DRYLL WILLIAMS, both of Risdon, Hobart, in the State of Tasmania, all in the Commonwealth of Australia, have invented certain new and useful Improvements in the Electrolytic Recovery of Zinc from Zinc-Bearing Ores and Metallurgical Products; and we do hereby declare the following to be a full, clear, and exact description of the invention, such as will enable others skilled in the art to which it appertains to make and use the same.

This invention relates to the electrolytic recovery of zinc from zinc-bearing ores and metallurgical products and refers more especially to the recovery of zinc by the electrolytic method from zinc sulphide ores (blende).

This invention is applicable to the treatment of concentrates, tailings, slimes and other metallurgical products, as well as crude ores, and in this specification the term "ores" will include such metallurgical products.

The recovery of zinc by the electrolytic method as at present practised, involves the use of a closed cycle of operations, the roasted ores being leached with spent electrolyte containing sulphuric acid, the resulting solution of zinc sulphate, after purification, being submitted to electrolysis for the deposition of cathode zinc and the formation of an electrolyte containing sulphuric acid for leaching fresh quantities of roasted ore.

One known process as at present applied to zinc sulphide ores can be broadly described as comprising the following steps:—

1. The ore is subjected to a preliminary roast for the reduction of the sulphur to from 5% to 8%.

2. This partially roasted material is given a final roast under such conditions as to control the amount of sulphate sulphur formed and leaving a minimum amount of sulphide sulphur and also for the purpose of eliminating any chlorine which may be present which interferes with the deposition in the electrolytic cells.

3. The "calcine" from 2 is then leached with spent electrolyte containing sulphuric acid.

4. The pulp or residue from this last operation is then classified in order to separate the coarse material which is passed to a tube mill and then to flotation machines; the flotation concentrates are passed to the reducing plant, whilst the residues are held for subsequent treatment.

5. The solution together with the slimes or fine material from the classifier of step 4 is passed to one or more thickeners, the overflow from which passes to the main solution circuit.

6. The thickened pulp from step 5 is passed to a filter from which the clear solution goes to the main solution circuit . . . The solid residues from this filtering operation are held for subsequent treatment as with the residues from the flotation machine of step 4.

7. The clear solution in the main circuit is passed to a Pachuca tank or other mixing apparatus where an amount of limerock is added to precipitate and coagulate the iron and silica present.

8. The pulp from step 7 is filtered, the filtrate passing to the main solution circuit, whilst the solids are withdrawn and discarded.

9. The main solution circuit from step 8 is then subjected to purification with zinc dust for removal of copper cadmium and other impurities.

10. The purified solution is electrolyzed with the production of cathode zinc, thus regenerating sulphuric acid which is used for leaching as in step 3 in a subsequent cycle.

In the treatment as above described, as at present practised, no satisfactory method has yet been devised for economically recovering the zinc from the residues mentioned in steps 4 and 6 and making the same available for electro-deposition.

Now, the object of this invention is to provide certain modifications in the above cycle of operations whereby a greater proportion of zinc from a given quantity of ore is made available in the electrolytic process, or, in other words whereby a higher percentage of zinc is recovered, as cathode zinc.

We accomplish this object by providing certain improvements in the electrolytic recovery of zinc, which consist in subjecting the residues obtained after leaching with dilute sulphuric acid or spent electrolyte to a treatment in which it is mixed with sulphuric acid and the mixture subjected to a heating operation in the presence of gases containing sulphur dioxide (such as roaster gases). The zinc is thereby converted to zinc sulphate, which is leached out from the residues and introduced into the main solution circuit for the recovery of the zinc by electrolysis. The gases containing sulphur dioxide in the presence of which the said heating operation is conducted are passed to an acid plant whereby any excess sulphuric acid used with the said residues is recovered. This heating operation is carried out at a temperature sufficiently high to decompose the iron sulphate formed in the presence of gas containing $SO_2$ but not high enough to substantially decompose the zinc sulphate.

This invention as thus summarized comprises the introduction into the electrolytic method for the recovery of zinc of a step which comprises the treatment of the residues after leaching calcines with spent electrolyte by mixing the said residues with sulphuric acid, and subjecting the resultant mixture to a heating or furnacing operation in the presence of gases containing sulphur dioxide (such as roaster gases), and utilizing the gases emanating from such heating or furnacing operation for the manufacture of sulphuric acid. In the treatment of such residues in which the zinc is present mostly as zinc ferrite, we have found that the amount of sulphuric acid required is very little in excess of that theoretically necessary for the sulphating of the insoluble zinc present, and that it is not necessary to add sufficient sulphuric acid for the sulphating of the iron present as well, as any sulphate of iron formed is converted to ferrite oxide in the subsequent operation, liberating $SO_2$ and $SO_3$ which gases are available for decomposing further zinc ferrite.

This mixing operation is performed in such an apparatus as will ensure a complete association of the acid with the material. An apparatus similar in design to a concrete mixer or a rotating drum has been found effective for the purpose.

In carrying out this mixing operation of the material with acid, we have found that nodules can be formed, and the formation of the nodules facilitates the subsequent furnacing operation wherein hot roaster gases are caused to pass through the mixture as in a shaft furnace.

The material with the requisite amount of acid, which may be added in stages, is maintained in a constant state of movement and thereby is agglomerated into the nodules.

The amount of permissible moisture will vary according to the strength of acid to be used, and also to the nature of the material. We have found when using 98% acid that good nodules can be formed if the moisture content of the residues is approximately 10%. After the mixture has been maintained in a state of movement for some time, any fines remaining can be agglomerated by the addition of a small amount of water. This water forms a plastic mass with the fines and this plastic mass subsequently forms nodules by the movement or rolling action of the apparatus. It has been found that the quantity of water added and the manner of its addition has an important bearing on the production of the nodules, but a simple laboratory experiment with any given sample of material will determine the best conditions. In some cases it is desirable that weaker acid be used, and with 60% acid we have found that efficient nodulising can be obtained if both acid and the residues aforesaid are first heated to a temperature of about 150° C.

This mixture of the zinc-bearing material and sulphuric acid (preferably in the form of nodules) is then subjected to a heating or furnacing operation in the presence of gases containing sulphur dioxide or roaster gases.

One form of furnace for this operation is in the nature of a shaft furnace which may be fed either continuously or intermittently, the sulphur dioxide or roaster gases being passed upwards through the charge of nodules which are of such a size that a free passage of the gases is permitted. These gases are usually hot, or external heat may be applied to maintain the requisite temperature for the conversion of all the zinc present to zinc sulphate. The roaster gases enriched by this sulphating reaction may then be passed to an acid plant for the manufacture of sulphuric acid. If these gases are to be subsequently treated in a "contact" plant for the recovery of sulphuric acid, it is preferable that the acid-mixed material should be first dried or heated to about 300° C. before roasting with a view to the elimination of moisture and noxious gases such as chlorine and fluorine.

We do not however confine ourselves to the use of a shaft furnace. This furnacing operation can be carried out in a rotary kiln or a roasting furnace or any other suitable type.

This furnacing or heating of the ores or other zinc bearing material mixed with sulphuric acid in the presence of gases containing $SO_2$ (such as roaster gases) is carried out preferably at a temperature above the dissociation point of the most refractory sulphate of iron but below that of the dissociation point of sulphate of zinc in the presence of gases containing $SO_2$. In practice we have found that a temperature of about 670° C. well answers the purpose although good results have been obtained at temperatures ranging from 620° C. to 740° C.

The sulphate of iron which is formed is converted into ferric oxide, liberating sulphur dioxide and sulphur trioxide which are available for decomposition of further zinc ferrite, and at the same time any excess passes over with roaster gases to the acid plant. In this way, relatively complete conversion of the zinc to sulphate is effected, whilst any excess acid added over that consumed in the sulphating of the zinc is substantially recovered, the iron being left for the most part in insoluble form. The insoluble zinc compounds are thus converted to soluble zinc sulphate, and may be leached out and used for the recovery of zinc by the electrolytic method or for the manufacture of lithopone or for any other industrial purpose.

In adapting this invention to the known methods for the electrolytic recovery of zinc from zinc sulphide ores (blende) such as represented by the aforesaid cycle of operations or sequence of steps several modifications may be adopted. Upon the accompanying sheet of drawings is illustrated a flow sheet of one such modification.

The zinc bearing ores as at "A," usually in the form of concentrates, are roasted as at "B" so as to contain about 5% sulphur as sulphide. This roasted ore is then leached at "C" with spent electrolyte containing sulphuric acid. The pulp from "C" passes a classifier "D" which delivers a product of slimes on the one hand relatively low in sulphide sulphur and a coarse material on the other hand relatively high in sulphide sulphur.

The slimes from the classifier "D" pass to thickeners "E," whilst the coarse material from "D" passes to flotation machines "F." The overflow from the thickeners "E" passes to an agitator "G" where it is treated with limerock and is then filtered as at "H," the clear solution passing to the main solution circuit for purification and thence to the electrolytic cells, whilst the solids are dumped. The pulp or residue from the thickeners "E" passes to filters "J," the clear solution from which joins the overflow from the thickeners "E," whilst the solids pass to a dryer "K." The products from the flotation machines "F" consist of tailings on the one hand relatively low in sulphide sulphur and concentrates on the other hand high in sulphide sulphur. The tailings from the flotation machines "F" pass to filters "L," the solids from which join the solids from the filters "J."

The concentrates from the flotation machines "F" pass to roasters "M," the gases from which are utilized as hereinbefore described, while the calcines are returned to the leaching tanks at "C." The material passing to the dryers "K" from the filters "J" and "L" is mixed with about 30% of its dry weight of sulphuric acid (98%) and maintained in a constant state of movement in a suitable machine, such as a concrete mixing machine "N," whereby it is formed into nodules. The amount of acid required will depend upon the amount of insoluble zinc present in the material.

The nodulized material from "N" is then dried, as at "O," and delivered into a shaft furnace "P" at the same time the roaster gases from "M" pass upwards through the nodules in the shaft furnace "P," so that the said nodules are subjected to a heating or furnacing operation at a temperature of approximately 670° C. The treated material from the shaft furnace "P," now being low in sulphur as sulphide but the zinc content of which has been converted to zinc sulphate, is delivered to leaching tanks "R" where it is leached with main circuit solution. The gases from the shaft furnace "P," after suitable scrubbing, are passed to an acid plant "T," thereby supplying a portion of the acid necessary for the mixing with the material at "B." The pulp from "R" is delivered to settlers "W," the clear solution from which passes to the main circuit and the pulp from which goes to agitators "X" where it is treated with limerock, after which it is filtered at "Y" the clear liquor from which goes to the main solution circuit whilst the residue is dumped for further treatment.

In the operation above illustrated it will be seen that the second or final roasting of step 2 as ordinarily practiced has been omitted, and that the ore is leached with spent electrolyte only after the partial roasting of step 1. Owing to this roasting having been only partial there will be more material passing to the flotation machines than heretofore and consequently a greater quantity of flotation concentrates containing sulphides. These flotation concentrates are roasted, the gases therefrom being used and the residues therefrom being treated as hereinafter described. In the furnacing operation of the residues mixed with sulphuric acid, a certain amount of silver is rendered soluble and this silver is precipitated by chlorides contained in the leaching solution. If insufficient chlorides are present for this purpose, soluble chlorides will be added.

By modifying the present treatment as above set out, it will be seen that it is not necessary to aim at a maximum conversion of zinc sulphide to zinc sulphate in the original roasting as hitherto practised, by reason of the fact that any mechanical or other losses of sulphuric acid and sulphates will be made up by the additional amount of zinc sulphate recovered from the residues and added to the main solution circuit. Any excess acid produced from the roasting of the flotation concentrates over and above that required for the sulphating of the residues can be utilized for other industrial purposes.

However, this modified treatment of the invention is not confined to the partial roasted product of step (1) but may be also applied to the finally roasted product of step (2) but in such case the flotation concentrates (from step 4) would be less in quantity but any deficit may be made up by additions of untreated ore, should there be insufficient for the production of the necessary amount of roaster gases, or such roaster gases may be those resulting from the final roasting of the untreated ore (as in step 2) as above described. Similarly, the treatment is applicable to material which has been "dead" roasted.

In some cases it may be desirable to carry out the heating operation of the mixture of residues and sulphuric acid other than in the presence of roaster gases; for example, the said heating operation may be effected in a muffle or other suitable furnace and the $SO_2$ and $SO_3$ recovered therefrom by appropriate means, if desired.

We claim:—

1. The process of electrolytic recovery of zinc from zinc-bearing material which consists in roasting the zinc-bearing material, leaching the roasted material with an acid solution, separating the solution from the residues, mixing the residues with sulphuric acid, furnacing the resulting mixture in the presence of sulphur dioxide to render the contained zinc soluble, and recovering by electrolysis the zinc which has been rendered soluble.

2. The process of electrolytic recovery of zinc from zinc-bearing material which consists in roasting the zinc-bearing material, leaching the roasted material with an acid solution, separating the solution from the residues, mixing the residues with sulphuric acid, furnacing the resulting mixture in the presence of sulphur dioxide to render the contained zinc soluble, treating the resulting gases for the production of sulphuric acid therefrom, and recovering by electrolysis the zinc which has been rendered soluble.

3. The process of electrolytic recovery of zinc from zinc-bearing material which consists in leaching the zinc-bearing material with an acid solution, separating the solution from the residues, nodulizing the residues with sulphuric acid, furnacing the resulting nodules in the presence of sulphur dioxide to render the contained zinc soluble, and recovering by electrolysis the zinc which has been rendered soluble.

4. The process of electrolytic recovery of zinc, which consists in roasting the zinc-bearing material with an acid solution to yield a main circuit solution and residues, separating the residues, mixing the residues with acid and furnacing the resulting mixture in the presence of sulphur dioxide to render the contained zinc soluble, leaching the furnaced product to obtain a solution containing the soluble zinc, and recovering the zinc from the solutions by electrolysis.

5. The process of electrolytic recovery of zinc from zinc-bearing material which consists in leaching the material with an acid solution to yield a main circuit zinc-bearing solution and residues, separating the residues, mixing the residues with sulphuric acid, heating the resulting mixture in the presence of gases containing sulphur dioxide to render the zinc soluble, leaching the heated product to extract the soluble zinc and produce a zinc-bearing solution, recovering the zinc from the solutions by electrolysis, and treating said sulphur dioxide gases to produce sulphuric acid therefrom.

6. The process of electrolytic recovery of zinc from zinc-bearing material which consists in roasting the zinc-bearing material, leaching the roasted material with an acid solution to form a main circuit solution, separating the solution from the residues, mixing the residues with sulphuric acid and heating in the presence of gases resulting from said roasting to render the zinc soluble, leaching the heated product to extract the soluble zinc and produce a zinc-bearing solution, recovering the zinc from the solutions by electrolysis, and heating said sulphur dioxide gases to produce sulphuric acid therefrom.

7. The process of electrolytic recovery of zinc from zinc-bearing material which consists in roasting the material, leaching the roasted material with an acid solution to produce a zinc-bearing main circuit solution, separating the residues, mixing the residues with sulphuric acid so as to form nodules and heating the nodules in roaster gases from said roasting operation to render the zinc soluble, treating the resulting gases to produce sulphuric acid, leaching the heated product to obtain a solution containing the soluble zinc, and recovering the zinc from the solutions by electrolysis.

8. The process of electrolytic recovery of zinc from zinc-bearing material containing sulphides which consists in roasting the material to convert part of the sulphides to oxides and produce calcines, leaching the calcines with acid-bearing spent electrolyte, separating the resulting zinc-bearing solution as a main circuit solution, subjecting the residues to froth-flotation separation to produce concentrates and residues, roasting the concentrates, adding the roasted concentrates to the calcines, mixing the flotation residues with sulphuric acid and heating in the presence of roaster gases from a previous step, leaching the heated residues to obtain a solution containing the soluble zinc, recovering the zinc from the solutions by electrolysis, and treating the gases from the heating operation to produce sulphuric acid.

9. The process of electrolytic recovery of zinc from zinc-bearing material containing sulphides which consists in roasting the ores to convert part of the sulphides to oxides as calcines, leaching the calcines with acid-bearing spent electrolyte to produce a main circuit solution, separating the coarse material from the fines and from the solution, subjecting the coarse material to froth-flotation separation, roasting the resulting concentrates to produce calcines, mixing the leached fines and the residues from froth-flotation with sulphuric acid, heating the sulphuric-acid-treated material in the presence of roaster gases from the roasting of the calcines, treating the resulting gases to produce sulphuric acid therefrom, leaching the sulphuric-acid-treated product to obtain a solution containing the soluble zinc, and recovering the zinc by electrolysis from the solutions.

In testimony that we claim the foregoing as our invention we have signed our names to this specification.

HERBERT WILLIAM GEPP.
HARRY HEY.
GILBERT RIGG.
ROYALE HILLMAN STEVENS.
ROWLAND THOMAS DRYLL WILLIAMS.